US008278800B2

(12) United States Patent
Abramovich et al.

(10) Patent No.: US 8,278,800 B2
(45) Date of Patent: Oct. 2, 2012

(54) MULTI-LAYER PIEZOELECTRIC GENERATOR

(75) Inventors: Haim Abramovich, Nesher (IL); Charles Milgrom, Moshav Aminadav (IL); Eugeny Harash, Haifa (IL); Lucy Edery Azulay, Haifa (IL); Uri Amit, Raanana (IL)

(73) Assignee: Innowattech Ltd., Haifa (IL)

( * ) Notice: Subject to any disclaimer, the term of this patent is extended or adjusted under 35 U.S.C. 154(b) by 523 days.

(21) Appl. No.: 12/509,875

(22) Filed: Jul. 27, 2009

(65) Prior Publication Data

US 2010/0045111 A1    Feb. 25, 2010

Related U.S. Application Data

(63) Continuation-in-part of application No. 12/195,670, filed on Aug. 21, 2008, now Pat. No. 7,812,508, and a continuation-in-part of application No. 12/204,958, filed on Sep. 5, 2008, now Pat. No. 7,830,071, and a continuation-in-part of application No. 12/353,764, filed on Jan. 14, 2009, now abandoned.

(51) Int. Cl.
*H02N 2/18* (2006.01)
*H01L 41/107* (2006.01)

(52) U.S. Cl. .................................................. 310/339
(58) Field of Classification Search .................... 310/339
See application file for complete search history.

(56) References Cited

U.S. PATENT DOCUMENTS

| | | | |
|---|---|---|---|
| 4,404,490 A | 9/1983 | Taylor et al. | |
| 4,412,148 A | 10/1983 | Klicker et al. | |
| 5,334,903 A * | 8/1994 | Smith | 310/358 |
| 5,340,510 A | 8/1994 | Bowen | |
| 5,376,859 A | 12/1994 | Kim et al. | |
| 5,461,924 A | 10/1995 | Calderara et al. | |
| 5,554,907 A | 9/1996 | Dixon | |
| 5,796,207 A * | 8/1998 | Safari et al. | 310/358 |
| 5,825,386 A | 10/1998 | Ohashi | |
| 6,137,424 A | 10/2000 | Cohen et al. | |
| 6,277,299 B1 | 8/2001 | Seyed-Bolorforosh | |
| 6,806,622 B1 | 10/2004 | Schmidt et al. | |
| 6,917,308 B2 | 7/2005 | Hilliard | |
| 7,528,528 B2 | 5/2009 | Zanella et al. | |
| 7,589,428 B2 | 9/2009 | Ghassemi | |
| 7,705,523 B2 * | 4/2010 | Wang et al. | 310/339 |

(Continued)

FOREIGN PATENT DOCUMENTS

CN    1633008    6/2005

(Continued)

*Primary Examiner* — Jaydi San Martin
(74) *Attorney, Agent, or Firm* — William H. Dippert; Eckert Seamans Cherin & Mellott, LLC

(57) ABSTRACT

A multilayer piezoelectric generator is disclosed comprising a round, rectangular or other shaped box having a cover. In the box are top and bottom electrodes and a plurality of electricity generating layers. Each Layer comprises a plurality of piezoelectric rods held in place by a matrix layer that fits snugly in the box and configured to accept shear strains developed in the rods when pressure is applied to the cover. The layers are separated by central electrode layers. The structure is configures such that pressure is evenly spreads among all the rods and causes the rods to make contacts with the electrodes. Rods in adjacent layers are oppositely poled, and the electrodes are configured and wired such that all the rods are connected parallel such that their generated charge is summed. Adaptation of the generator to its application is done by changing the number and thickness of the layers.

20 Claims, 13 Drawing Sheets

U.S. PATENT DOCUMENTS

| | | | |
|---|---|---|---|
| 7,839,028 B2 * | 11/2010 | Pinkerton | 310/10 |
| 8,067,878 B1 * | 11/2011 | Lu et al. | 310/339 |
| 2003/0051561 A1 | 3/2003 | Weiss | |
| 2005/0127677 A1 | 6/2005 | Luttrull | |
| 2005/0258717 A1 | 11/2005 | Mullen | |
| 2006/0087201 A1 | 4/2006 | Spinelli | |
| 2006/0118678 A1 | 6/2006 | Wells, II et al. | |
| 2008/0017356 A1 * | 1/2008 | Gruss et al. | 165/104.33 |
| 2008/0083139 A1 * | 4/2008 | Mullen | 36/136 |
| 2009/0195124 A1 * | 8/2009 | Abramovich et al. | 310/339 |
| 2010/0063557 A1 * | 3/2010 | Imran | 607/4 |
| 2010/0117488 A1 * | 5/2010 | Wang et al. | 310/339 |
| 2010/0141095 A1 * | 6/2010 | Park | 310/339 |
| 2011/0163636 A1 * | 7/2011 | Sirbuly et al. | 310/339 |

FOREIGN PATENT DOCUMENTS

| | | |
|---|---|---|
| CN | 1633009 | 6/2005 |
| EP | 0491655 | 6/1992 |
| EP | 1783026 | 5/2007 |
| EP | 1840982 | 10/2007 |
| GB | 2389249 | 12/2003 |
| JP | 2006141478 | 5/1994 |
| JP | 2010073073 | 3/1998 |
| JP | 2002063685 | 2/2002 |
| JP | 2005353015 | 12/2005 |
| JP | 2006197704 | 7/2006 |
| JP | 2008098564 | 4/2008 |
| WO | W02006053479 | 5/2006 |
| WO | WO 2010131820 A1 * | 11/2010 |

\* cited by examiner (a)

(b)

(c)

MULTI-LAYER PIEZOELECTRIC GENERATOR

CROSS REFERENCE TO RELATED APPLICATION(S)

The present invention is a Continuation-in-Part Application of co-pending, commonly assigned U.S. patent application Ser. No. 12/195,670, filed Aug. 21, 2008; U.S. patent application Ser. No. 12/204,958, filed Sep. 5, 2008; and U.S. patent application Ser. No. 12/353,764, filed Jan. 14, 2009, all of which are incorporated herein in their entirety.

FIELD OF THE INVENTION

The present invention relates to a multilayer modular energy harvesting apparatus, system for using said apparatus and method for implementation said apparatus.

BACKGROUND OF THE INVENTION

Piezoelectricity is the ability of certain crystalline materials to develop an electrical charge proportional to an applied mechanical stress. The converse effect can also be seen in these materials where strain is developed proportional to an applied electrical field. The Curie's originally discovered it in the 1880's. Today, piezoelectric materials for industrial applications are lead based ceramics available in a wide range of properties. Piezoelectric materials are the most well known active material typically used for transducers as well as in adaptive structures.

Mechanical compression or tension on a poled piezoelectric ceramic element changes the dipole moment, creating a voltage. Compression along the direction of polarization, or tension perpendicular to the direction of polarization, generates voltage of the same polarity as the poling voltage. Tension along the direction of polarization, or compression perpendicular to the direction of polarization, generates a voltage with polarity opposite that of the poling voltage. These actions are generator actions—the ceramic element converts the mechanical energy of compression or tension into electrical energy. This behavior is used in fuel-igniting devices, solid state batteries, force-sensing devices, and other products. Values for compressive stress and the voltage (or field strength) generated by applying stress to a piezoelectric ceramic element are linearly proportional up to a material-specific stress. The same is true for applied voltage and generated strain.

The review article "Advances In Energy Harvesting Using Low Profile Piezoelectric Transducers" by Shashank Priya, published in J Electroceram (2007) 19:165-182 provides a comprehensive coverage of the recent developments in the area of piezoelectric energy harvesting using low profile transducers and provides the results for various energy harvesting prototype devices. A brief discussion is also presented on the selection of the piezoelectric materials for on and off resonance applications.

The paper "On Low-Frequency Electric Power Generation With PZT Ceramics" by Stephen R. Platt, Shane Farritor, and Hani Haider, published in IEEE/ASME Transactions On Mechatronics, VOL. 10, NO. 2, April 2005 discusses the potential application of PZT based generators for some remote applications such as in vivo sensors, embedded MEMS devices, and distributed networking. The paper points out that developing piezoelectric generators is challenging because of their poor source characteristics (high voltage, low current, high impedance) and relatively low power output.

The article "Energy Scavenging for Mobile and Wireless Electronics" by Joseph A. Paradiso and Thad Starner, published by the IEEE CS and IEEE ComSoc, 1536-1268/05 reviews the field of energy harvesting for powering ubiquitously deployed sensor networks and mobile electronics and describers systems that can scavenge power from human activity or derive limited energy from ambient heat, light, radio, or vibrations.

In the review paper "A Review of Power Harvesting from Vibration using Piezoelectric Materials" by Henry A. Sodano, Daniel J. Inman and Gyuhae Park published in The Shock and Vibration Digest, Vol. 36, No. 3, May 2004 197-205, Sage Publications discuses the process of acquiring the energy surrounding a system and converting it into usable electrical energy—termed power harvesting. The paper discuss the research that has been performed in the area of power harvesting and the future goals that must be achieved for power harvesting systems to find their way into everyday use.

Intl. Patent Application WO/07/038157A2 entitled "Energy Harvesting Using Frequency Rectification" to Carman Gregory P. and Lee Dong G.; filed: Sep. 21, 2006 discloses an energy harvesting apparatus for use in electrical system, having inverse frequency rectifier structured to receive mechanical energy at frequency, where force causes transducer to be subjected to another frequency.

U.S. Pat. No. 5,265,481 to Sonderegger, Hans C., et al. entitled "Force sensor systems especially for determining dynamically the axle load, speed, wheelbase and gross weight of vehicles" discloses sensor system incorporated in road surface—has modular configuration for matching different road widths.

SUMMARY OF THE INVENTION

The present invention relates to a multilayer modular energy harvesting apparatus, system for using said apparatus and method for implementation said apparatus.

According to an exemplary embodiment of the invention, a multilayer generator is provided comprising: a box having a top cover; a bottom electrode placed above the bottom of said box; a top electrode placed below said top cover; and a multilayer electricity generating structure positioned between said bottom electrode and top electrode, each layer of said multilayer electricity generating structure comprising a plurality of piezoelectric rods held in place by a matrix layers, wherein: thickness of said matrix layer is smaller than length of said plurality of piezoelectric rods in the corresponding layer, said piezoelectric rods are oppositely poled in alternating layers, adjacent layers are separated by a central electrode.

In some embodiments, said box and said matrix layers are substantially cylindrical.

In some embodiments, said box constructed of a round top cover, a round bottom cover and a cylindrical mid section.

In some embodiments, said round top cover and said round bottom cover are substantially identical.

In some embodiments, said matrix layers are shaped and sized to snugly fit inside said box.

In some embodiments, said matrix layers are configured to withstand sheer stresses in said plurality of piezoelectric rods due to pressure applied on said cover.

In some embodiments, said matrix layers are made of a non-conductive material selected from the group comprising: glass; PLEXIGLAS (Extruded Acrylic Plexiglass); thermoplastics; reinforced resin and concrete.

In some embodiments, said cover is further configured such when pressure is applied to said cover, said applied pressure causes mechanical and electrical contact between ends of said piezoelectric rods and the nearest electrodes.

In some embodiments, said rods in each layer are poled in the same direction, and are electrically connected in parallel by two of said electrodes such that the charge generated by said layer is the sum of the charges generated by all the rods in said layer.

In some embodiments, said alternating electrode layers are joined such that the voltage generated by said entire multilayer generator is substantially equal to the voltage generated by one rod, and the charge generated by said entire multilayer generator is substantially equal to the sum of charges generated by all said rods.

In some embodiments, said generator further comprising fasteners, wherein said fasteners are configured to apply pre-loading force on said cover.

In some embodiments, said cover is stiff and is configured to substantially evenly spread force applied to said cover among said piezoelectric rods.

In some embodiments, said generator further comprising a load spreading layer situated between said cover and said top electrode, said load spreading layer configured to receive force applied to said cover and to substantially evenly spread force among said piezoelectric rods.

In some embodiments, said at least one of said box and said cover is made of concrete.

In some embodiments, said box and said matrix layers are shaped as polygons.

In some embodiments, said generator further comprising a seal situated between said box and said cover.

According to another exemplary embodiment of the invention, a multilayer super-module generator is provided comprising: a box having a plurality of chambers; and at least one top cover, wherein in each chamber: a bottom electrode placed above the bottom of said chamber; a top electrode placed below said top cover; and a multilayer electricity generating structure positioned between said bottom electrode and top electrode, each layer of said multilayer electricity generating structure comprising a plurality of piezoelectric rods held in place by a matrix layers, wherein: thickness of said matrix layer is smaller than length of said plurality of piezoelectric rods in the corresponding layer, said piezoelectric rods are oppositely poled in alternating layers, adjacent layers are separated by a central electrode.

In some embodiments, each chamber has a separate top cover.

In some embodiments, all the chambers are covered by same top cover.

In some embodiments, said rods in each layer in each chamber are poled in the same direction, and are electrically connected in parallel by two of said electrodes, alternating electrode layers in each chamber are joined such that the voltage generated by said entire multilayer generator in each chamber is substantially equal to the voltage generated by one rod, and the charge generated by said entire multilayer generator is substantially equal to the sum of charges generated by all said rods, and said generators in said chambers are electrically joined in parallel.

According to another exemplary embodiment of the invention, a method of installing an energy harvesting system in a road comprising the steps of: drilling an array of circular holes in said road; cutting slots in said road, joining said circular holes; placing a round piezoelectric energy generator in each of said drilled holes; placing connecting cables in said cut slots; and covering said connecting cables in said cut slots.

In some embodiments, said method further comprising covering said round piezoelectric energy generators placed in said drilled holes.

In some embodiments, said round piezoelectric energy generators are placed in said drilled holes such that upper surface of said round piezoelectric energy generators are flush with the surface of said road.

In some embodiments, the step of drilling an array of circular holes in said road comprises using cup drill.

In some embodiments, said method further comprising pouring a reinforcing layer at the bottom of said drilled hole before placing a round piezoelectric energy generator in each of said drilled holes.

According to another exemplary embodiment of the invention, a method of installing an energy harvesting system in a railroad comprising the steps of: providing a sleeper having a cavity under the track mount; placing in said cavity a multilayer generator comprising: a bottom electrode placed above the bottom of cavity; a top electrode placed below said mount; and a multilayer electricity generating structure positioned between said bottom electrode and top electrode, each layer of said multilayer electricity generating structure comprising a plurality of piezoelectric rods held in place by a matrix layers, wherein: thickness of said matrix layer is smaller than length of said plurality of piezoelectric rods in the corresponding layer, said piezoelectric rods are oppositely poled in alternating layers, and adjacent layers are separated by a central electrode, alternating electrode layers are joined such that said rods are electrically connected in parallel; and attaching said mount and said track to said sleeper such that force applied by a train traveling over said track causes generation of electric energy in said piezoelectric rods.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

The invention is capable of other embodiments or of being practiced or carried out in various ways. Also, it is to be understood that the phraseology and terminology employed herein is for the purpose of description and should not be regarded as limiting.

In discussion of the various figures described herein below, like numbers refer to like parts.

Figure 1:
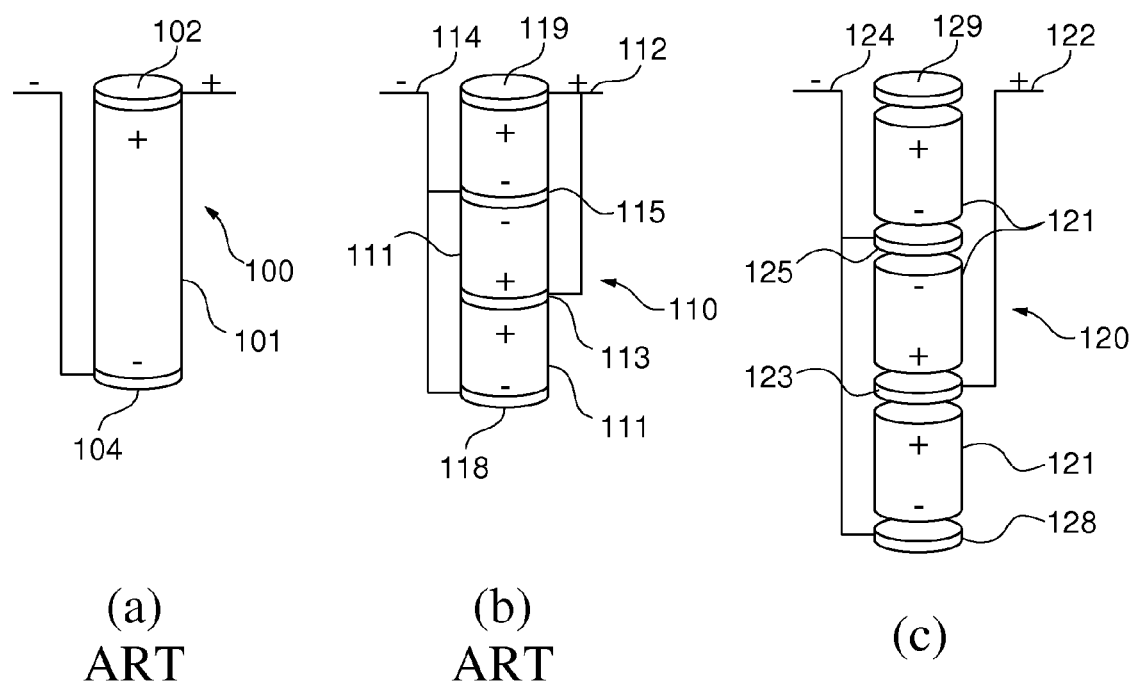

The drawings are generally not to scale. For clarity, non-essential elements were omitted from some of the drawings.

In the drawings:

FIG. 1(a) depicts piezoelectric rods as used in the art.

FIG. 1(b) depicts piezoelectric rods as used in the art.

FIG. 1(c) depicts a multilayer piezoelectric stack according to an exemplary embodiment of the current invention.

Figure 2A:
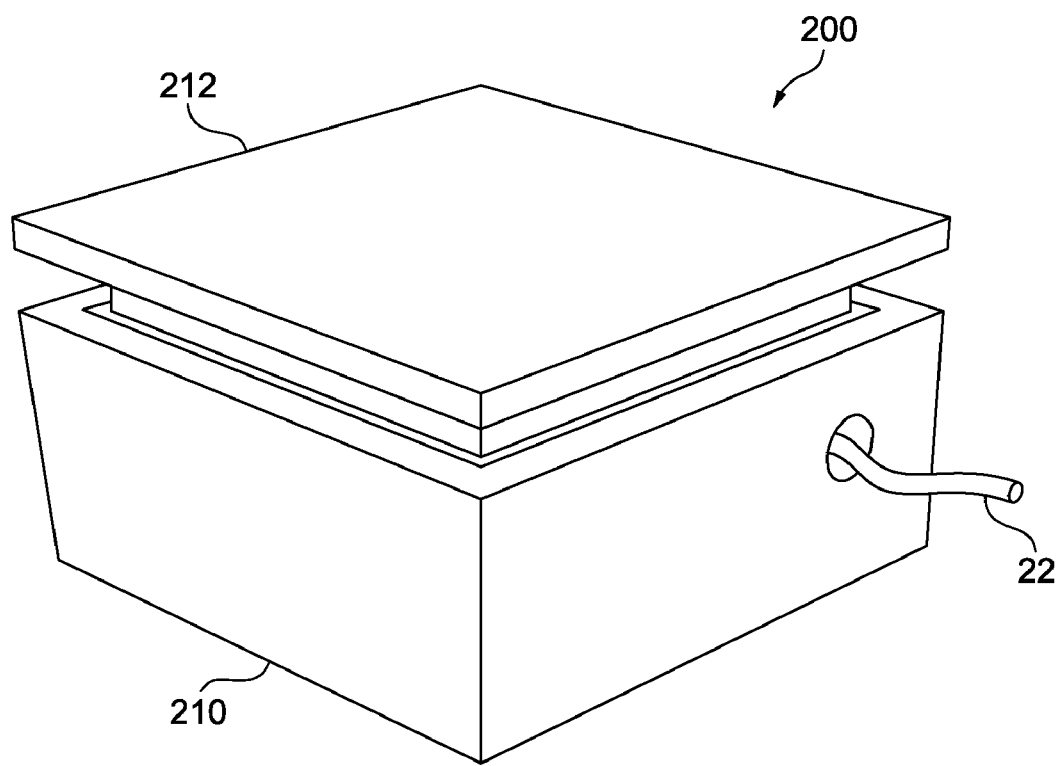

FIG. 2(a) schematically depicts an isometric view of a multilayer modular generator according to an exemplary embodiment of the current invention.

Figure 2B:
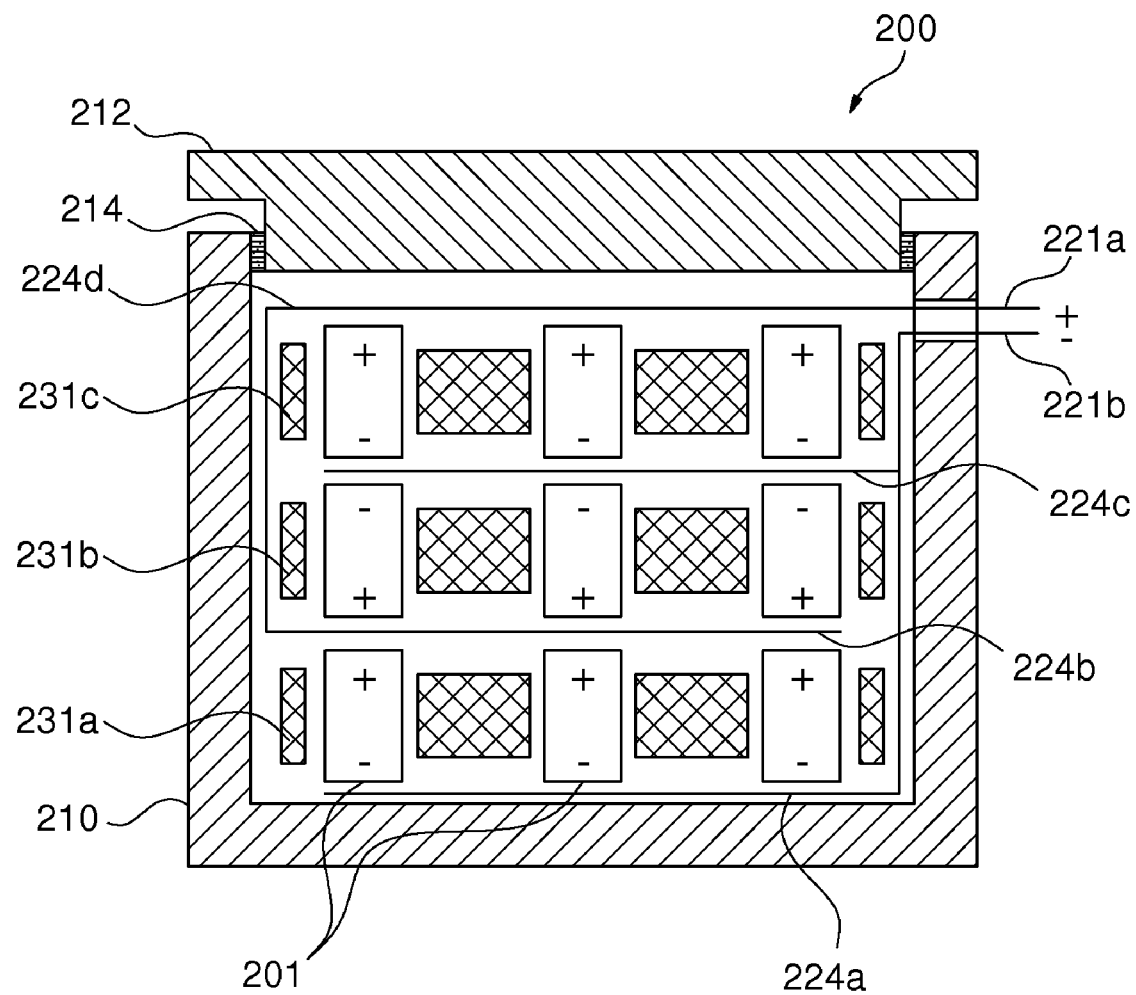

FIG. 2(b) schematically depicts a cross-sectional view of a multilayer modular generator according to an exemplary embodiment of the current invention.

Figure 3:
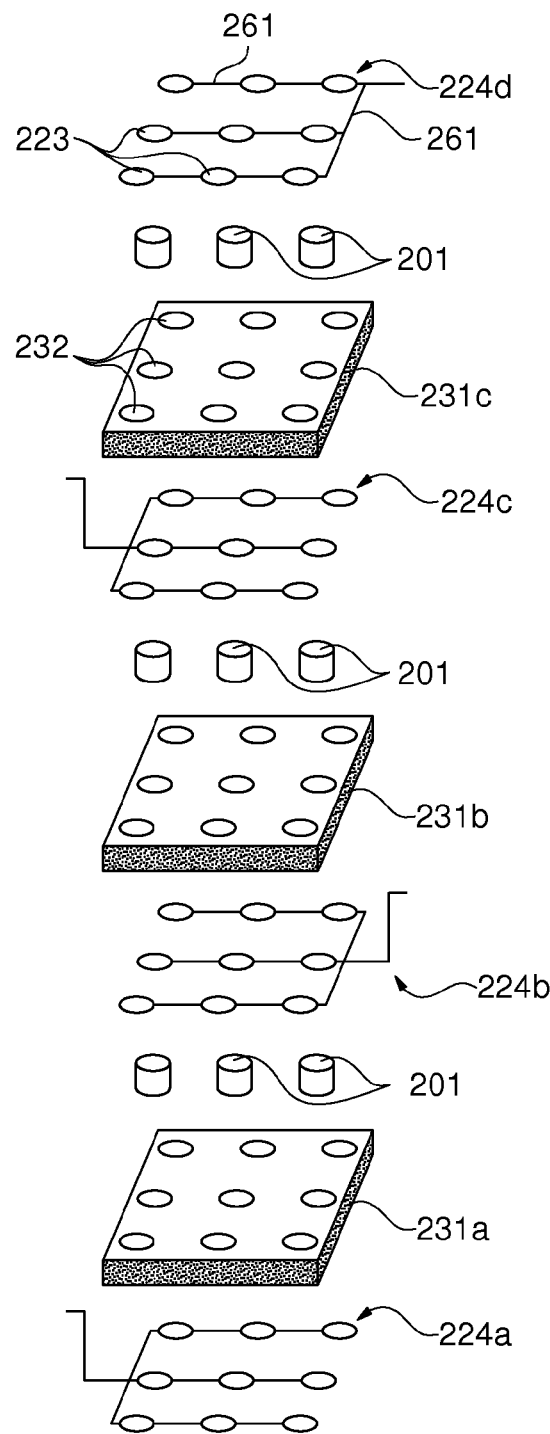

FIG. 3 schematically depicts an exploded view of the internal elements of a multilayer modular generator according to an exemplary embodiment of the current invention.

Figure 4A:
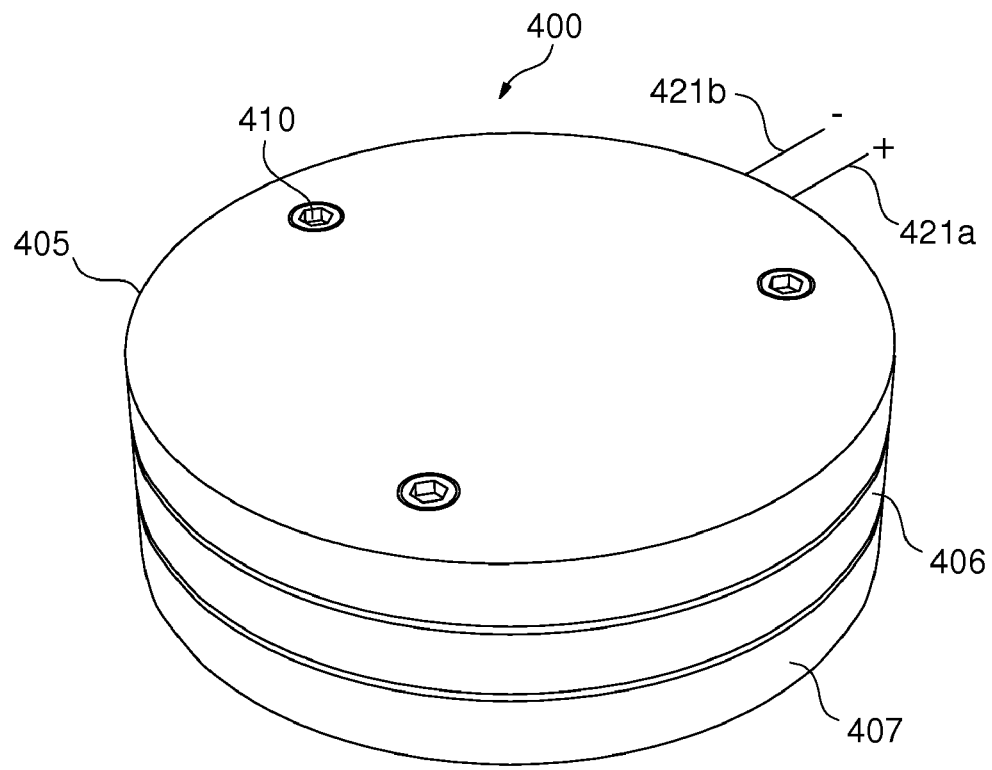

FIG. 4(a) schematically depicts an isometric view of a round multilayer modular generator according to another exemplary embodiment of the current invention.

Figure 4B:
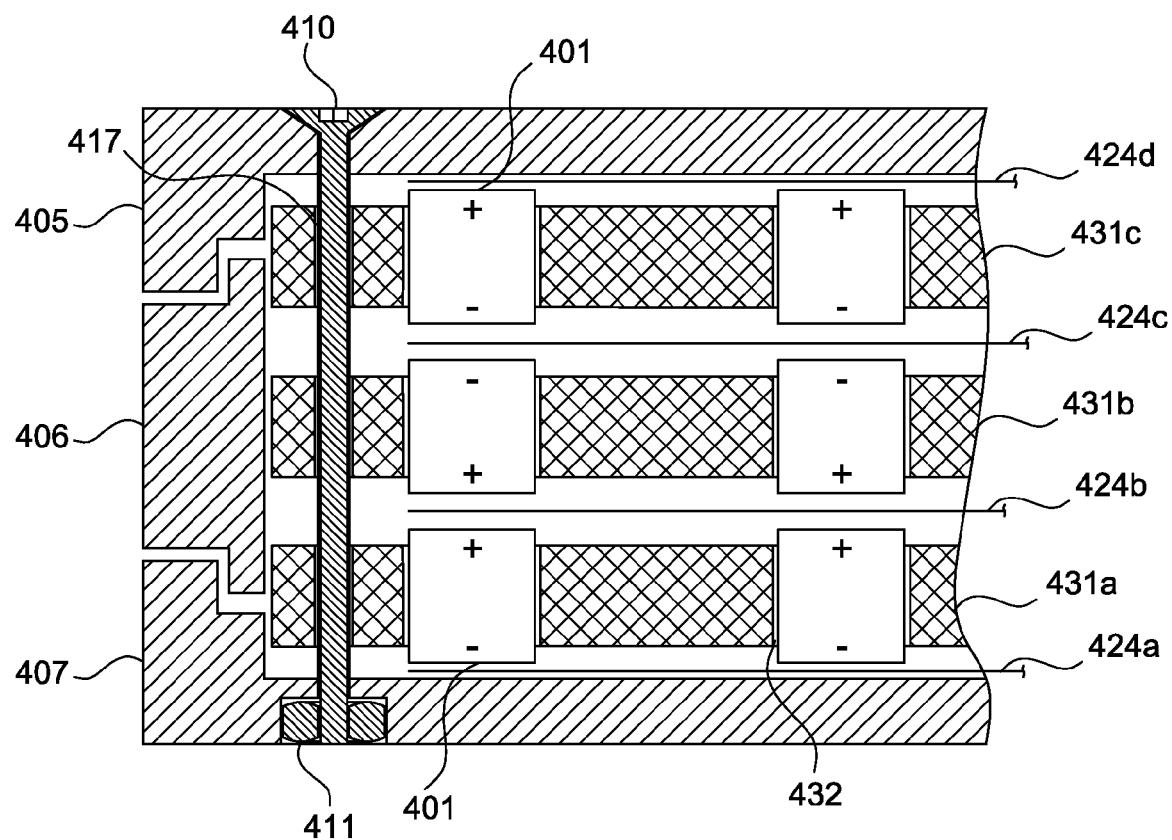

FIG. 4(b) schematically depicts a cross-sectional view of a round multilayer modular generator according to another exemplary embodiment of the current invention.

Figure 4C:
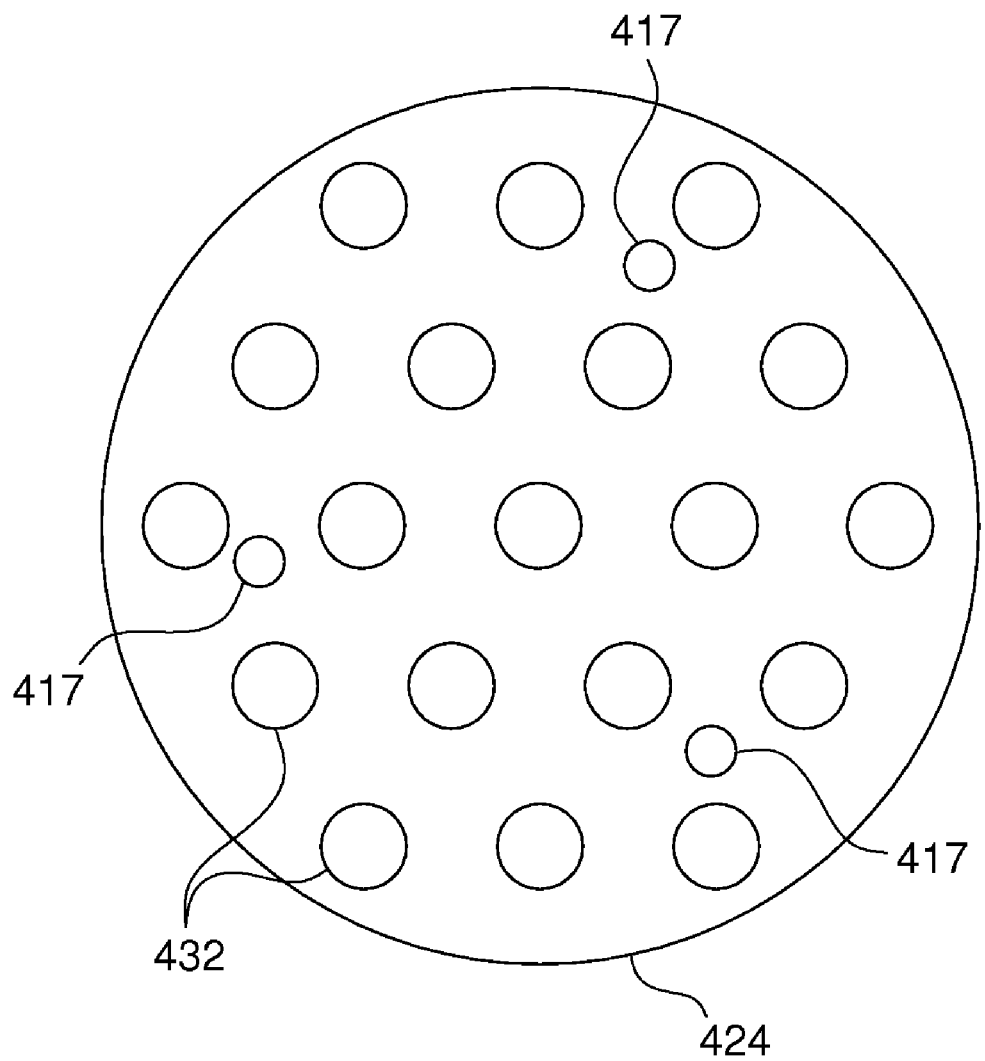

FIG. 4(c) schematically depicts a top view of a matrix layer used in a round multilayer modular generator according to another exemplary embodiment of the current invention.

FIG. 5(a) illustrates a cross section of a road with round multilayer modular generators embedded in it and vehicle over it, according to another exemplary embodiment of the current invention.

FIG. 5(b) schematically depicts the stress distribution caused by a passing vehicle on a round multilayer modular generator according to another exemplary embodiment of the current invention.

FIG. 5(c) schematically depicts a graph of the stress distribution caused by a passing vehicle according to another exemplary embodiment of the current invention.

Figure 6:
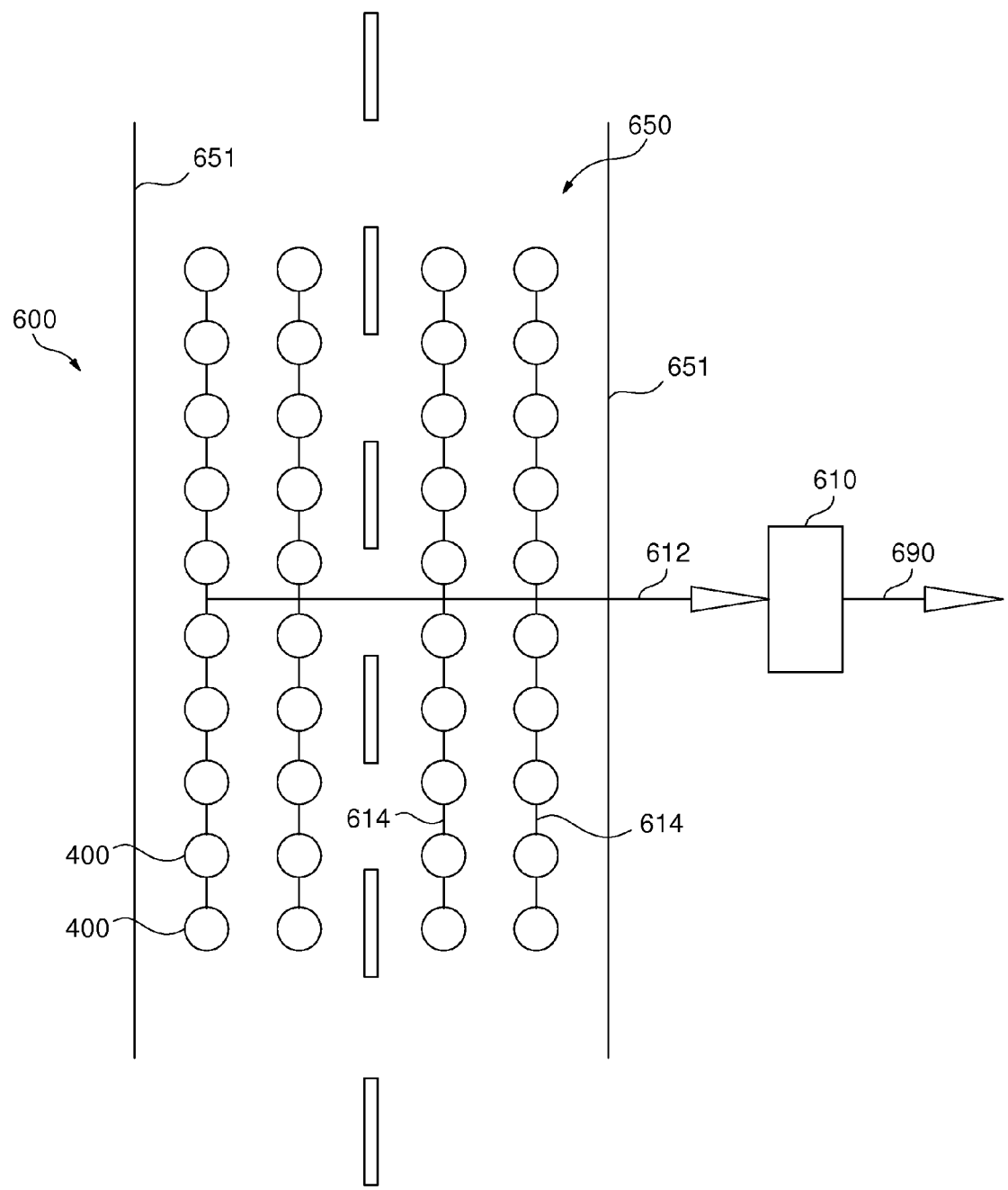

FIG. 6 schematically depicts a system for energy harvesting implemented in a road and using a plurality of round multilayer modular generators according to another exemplary embodiment of the current invention.

Figure 7:
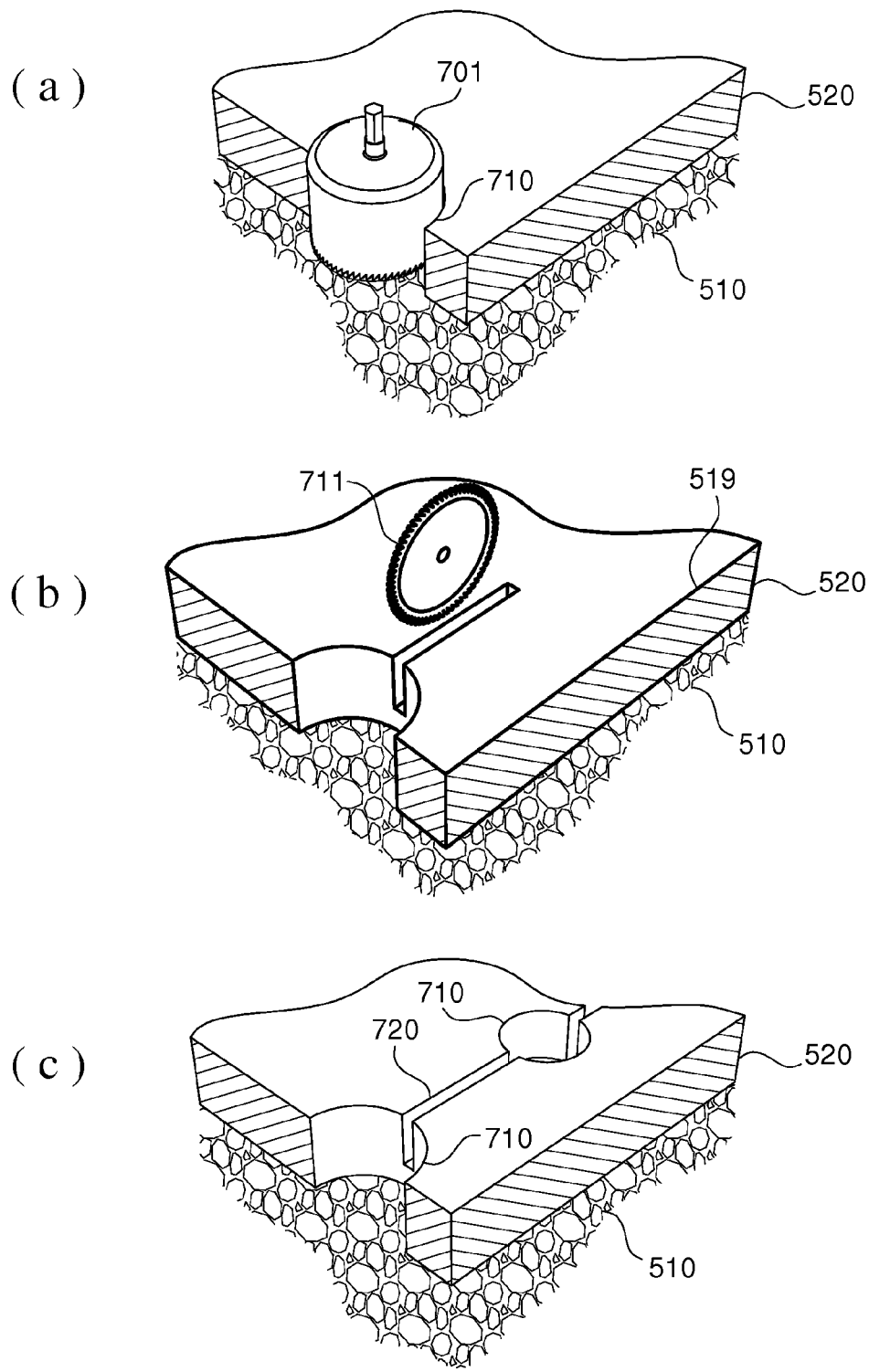
Figure 7:
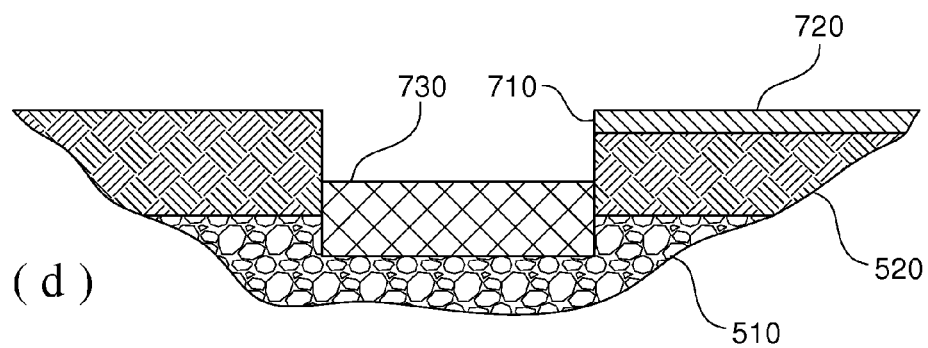
Figure 7:
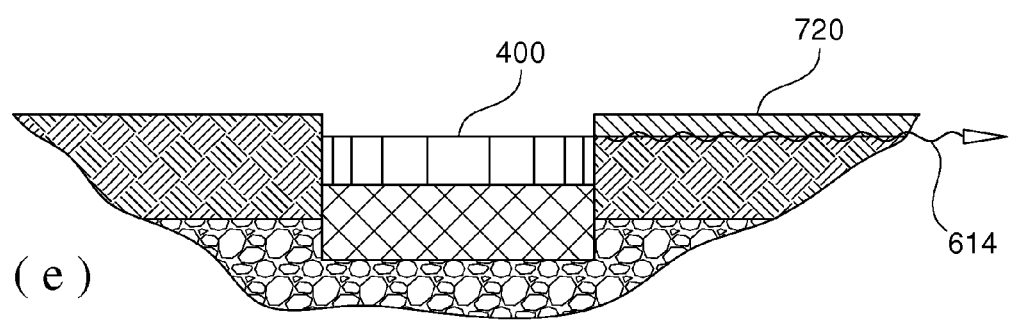
Figure 7:
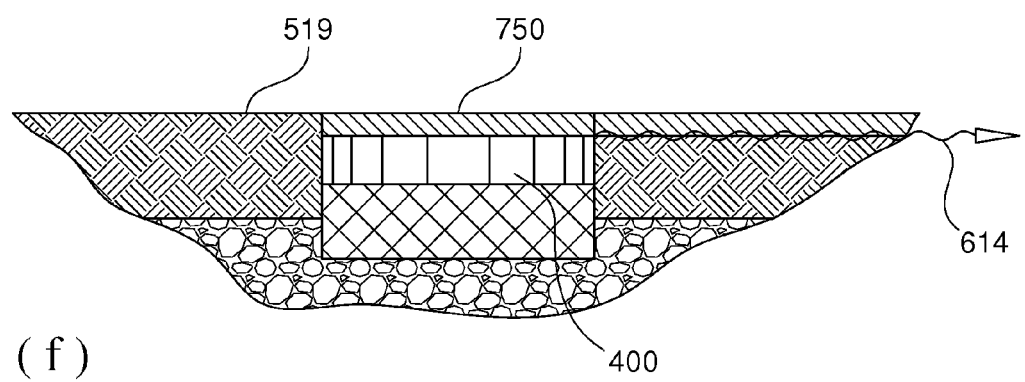

FIGS. 7(a-f) schematically depict steps of constructing an energy harvesting system by embedding a plurality of round multilayer modular generators according to an exemplary embodiment of the current invention.

FIG. 7(a) schematically depicts drilling, in a road, holes for embedding round multilayer modular generators, preferably using a cup drill.

FIG. 7(b) schematically depicts drilling, in a road, holes for embedding round multilayer modular generators, preferably using a cup drill.

FIG. 7(c) schematically depicts cutting, in a road, slits for embedding connecting cable, preferably using a disk saw.

FIG. 7(d) schematically depicts optional stage of pouring reinforcing layer, preferably made of concrete at the bottom of the drilled hole.

FIG. 7(e) schematically depicts the stage of laying the round multilayer modular generators and the connecting cables in the drilled holes and the cut slits respectively; and FIG. 7(f) schematically depicts the stage of refilling the drilled holes and the cut slits, preferably with asphalt.

Figure 8:
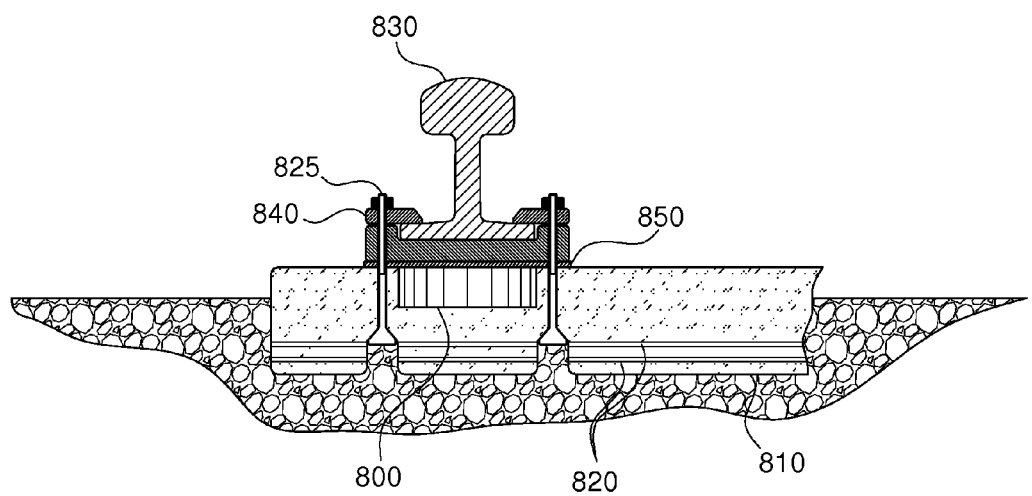

FIG. 8 schematically depicts a cross section of a railway sleeper with a modular multilayer generator according to yet another exemplary embodiment of the current invention.

Figure 9A:
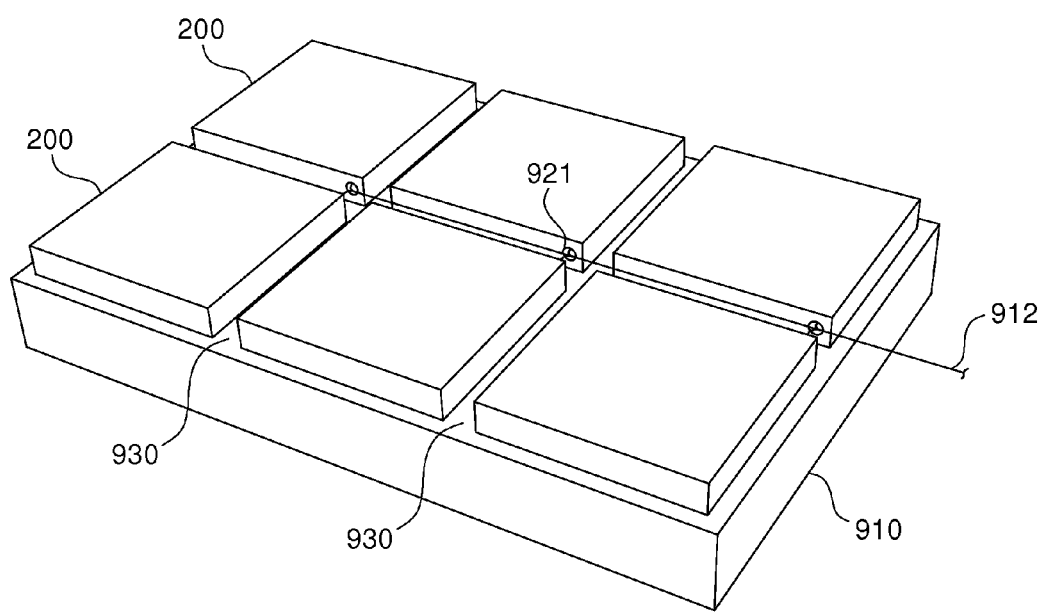

FIG. 9(a) schematically depicts an isometric view of a multilayer super-module generator according to yet another exemplary embodiment of the current invention.

Figure 9B:
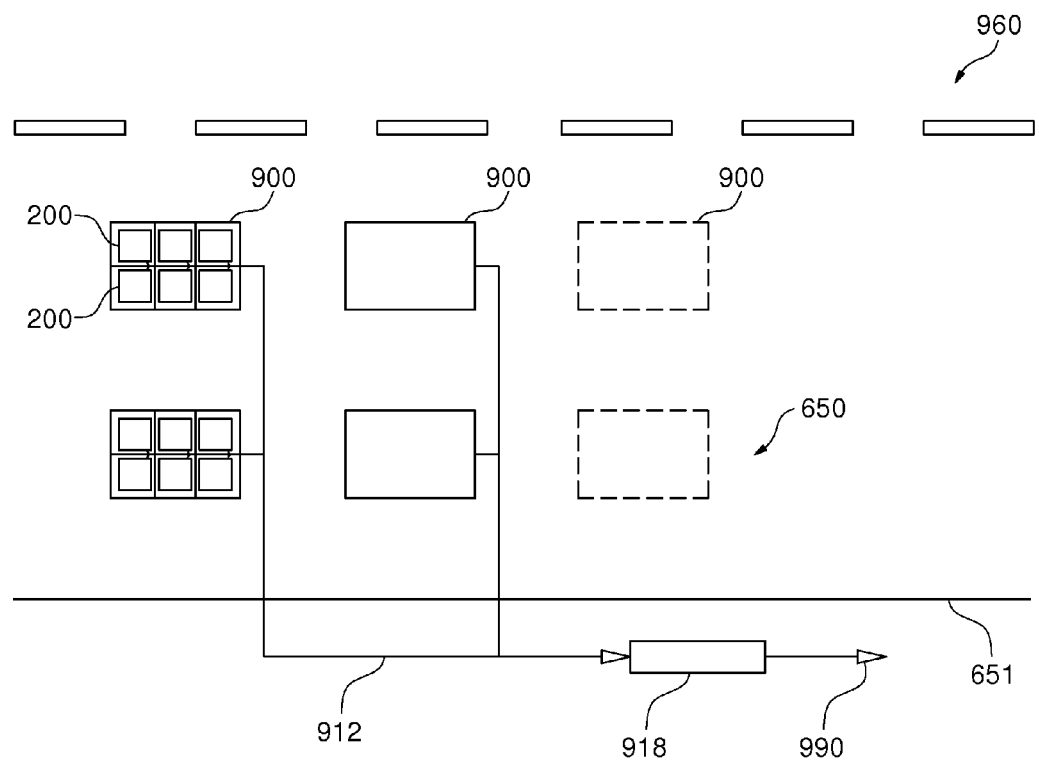

FIG. 9(b) schematically depicts a system for energy harvesting, implemented in a road and using a plurality of multilayer super-module generators according to yet another exemplary embodiment of the current invention.

DESCRIPTION OF THE PREFERRED EMBODIMENTS

The present invention relates to a modular energy harvesting apparatus, system for using said apparatus and method for implementation said apparatus.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways.

FIG. 1 schematically depicts piezoelectric elements.

FIG. 1(a) and FIG. 1(b) depict piezoelectric rods used in the art, while FIG. 1(c) depicts a multilayer piezoelectric stack according to an exemplary embodiment of the current invention.

FIG. 1(a) shows a single layer piezoelectric rod used in the art for energy generation. When rod 100, made of an elongated piezoelectric material 101, is subjected to longitudinal force, high voltage is generated between the positive end electrode 102 and negative end electrode 104, which are bonded to the elongated piezoelectric material 101. It should be noted that while the generated voltage is high, the electric current that can be harvested is small. It was found that controlling a generated electrical signal having high voltage and low current is difficult. Converting such a signal to useful electrical power that can be transported, used and stored may be expensive and inefficient due to the high voltage generated.

FIG. 1(b) schematically depicts a multilayer integrated piezoelectric rod 110 as used in the art. Integrated rod 110 comprises a plurality of layers 111, each made of piezoelectric material, where adjacent layers are oppositely poled (three such layers are seen, but number of layer may be larger). The layers 111 are separated by electrodes, for example positive central electrode 113 and negative central electrode 115. Central electrodes as well as end electrodes are bonded to their adjacent layer, thus creating a single monolithic, multi-layer stack. All positive electrodes (in this case positive central electrode 113 and positive end electrode 119) are connected together to the positive terminal 112. Similarly, all negative electrodes (in this case negative central electrode 115 and negative end electrode 118) are connected together to the negative terminal 114.

When rod 110, is subjected to longitudinal force, a relatively voltage is generated between the positive terminal 112 and negative terminal 114. Compared to the signal generated by single layer rod 100, the signal generated by monolithic multilayer rod 110 is N times smaller while the generated charge (or current for the close-loop circuit) is N times larger (wherein N is the number of layers).

It should be noted that the process of bonding the electrodes and creating a monolithic multilayer stack might be expensive.

FIG. 1(c) schematically depicts a multilayer piezoelectric stack 120 according to an exemplary embodiment of the current invention. Multilayer piezoelectric stack 120 comprises a plurality of separate piezoelectric rods 121, each made of piezoelectric material, where adjacent layers are oppositely poled (three such layers are seen, but number of layer may be larger). The rods 121 are separated by electrodes, for example positive central electrode 123 and negative central electrode 125. Central electrodes as well as end electrodes are not bonded to their adjacent layers, but instead make mechanical and electrical contact with the layer when the stack is under pressure. All positive electrodes (in this case positive central electrode 123 and positive end electrode 129) are connected together to the positive terminal 122. Similarly, all negative electrodes (in this case negative central electrode 125 and negative end electrode 128) are connected together to the negative terminal 124.

When rod 120, is subjected to longitudinal force, voltage is generated between the positive terminal 122 and negative terminal 124. Compared to the signal generated by single layer rod 100, the voltage output generated by multilayer stack 120 is N times smaller while the generated charge (or current) is N times larger (wherein N is the number of layers).

As multilayer stack 120 is not bonded, it is preferably supported by an external support structure which will be seen in the following figures. Assembling the multilayer stack 120 is easy and cheap as it requires only stacking the layers and the electrodes within the supporting structure. Additionally, the support structure may be configured to prevent the multilayer stack 120 from bucking under pressure by resisting shear forces that may developed as the stack tries to bend. Thus, it may be possible to apply larger forces on a supported multilayer stack 120 than to the monolithic rod 100.

It should be noted that piezoelectric rods 121 are appears as having cylindrical shape in FIG. 1(c) as exemplary embodiment. Other shapes may be used. For example, rods may have square rectangular, hexagonal, oval or any other cross-section. Length of the rods may vary, wherein for the same stress, shorter rods yields lower voltage than longer rods. Shorter rods enable situating more rods along the same length of multilayer stack 120, thus generating larger charge for the same applied longitudinal force.

FIG. 2(a) schematically depicts an isometric view of a multilayer modular generator according to an exemplary embodiment of the current invention.

Multilayer modular generator 200 comprises a box 210 and a cover 212. An electric cable 221, preferably comprising a positive lead and a negative lead, transfers electrical signal generated by a plurality of supported multilayer stacks 120 within box 210 in response to pressure applied to cover 212.

FIG. 2(b) schematically depicts a cross-sectional view of a multilayer modular generator according to an exemplary embodiment of the current invention.

Multilayer modular generator 200 comprises a box 210 and a cover 212. An electric cable 221, preferably comprising a positive lead 221a and a negative lead 221b, transfers electrical signal generated by a plurality of supported multilayer stacks within box 210 in response to pressure applied to cover 212. Preferably, a flexible seal 214 may be used to prevent moisture and dirt from entering the box, while allowing small relative motion of the cover in response to force applied to it.

Piezoelectric stacks within box 210 comprises of plurality of individual piezoelectric elements 201, arranged in layers. Elements 201 in each layer are held in place by a matrix layer 231 (tree such matrix layers: 231a, 231b and 231c are seen, but number of layers may be two or larger than three). Piezoelectric elements in adjacent layers are oppositely poled and are separated by central electrode layers (two such electrode layers are seen, positive central electrode layer 224a and negative central electrode layer 224c). Top surfaces of piezoelectric elements in top layer make contact with top electrode layer (in the example depicted here—positive end electrode layer 224d). Similarly, bottom surfaces of piezoelectric elements in bottom layer make contact with bottom electrode layer (in the example depicted here—negative end electrode layer 224a).

All positive electrodes (in this case positive central electrode 224b and positive end electrode 224d) are connected together to the positive terminal 221a. Similarly, all negative electrodes (in this case negative central electrode 224c and negative end electrode 224a) are connected together to the negative terminal 221a.

FIG. 3 schematically depicts an exploded view of the internal elements of a multilayer modular generator 200 according to an exemplary embodiment of the current invention.

In this figure, the arrangement of piezoelectric elements 201 in a layers and columns can be seen. In each layer the piezoelectric elements 201 are arranged in a substantially identical two-dimensional array and held in place in holes 232 in the corresponding matrix layer 231. For clarity, only few of the piezoelectric elements 201 were presented.

In the exemplary embodiment, a 3×3 array of piezoelectric elements 201 is depicted for clarity. However larger array are typically used. The array need not be square or symmetrical. Preferably, the shape of the matrix layer, the box and the cover is such that it can tile a surface (triangle, rectangular, square, or hexagonal). Similarly, any shape may be selected, such as oval, round, etc, within the general scope of the current invention.

Number of Matrix layers 231 is preferably equal to the number of layers of piezoelectric elements 201. In the exemplary embodiment, three layers of piezoelectric elements 201 are depicted for clarity (held in place by matrix layers 231a, 231b and 231c). However any number of layers may be used.

Matrix layers 231 are preferably made of strong, nonconductive material so it can support piezoelectric elements 201 against shear stresses while electrically insulating them and the electrode layers. In a preferred embodiment of the invention, matrix layers 231 are made of glass sheets having holes 232 drilled in them. Optionally, the glass sheets are tempered or thermally treated to reduce internal stress or increase strength after holes 232 were drilled. Alternatively, glass sheet are casted. Using glass to manufacture the matrix layers is advantageous due to the mechanical and electrical properties of glass. Additionally, glass is cheap, nontoxic, easily processed, and easily disposable or recyclable. Alternatively, molded plastic is used. It should be noted that matrix layers may also be patterned with holes other than holes 232 for reducing cost and weight.

Central electrodes 224b and 224c as well as end electrodes 224a and 224d are preferably patterned having contact pads 223 electrically connected by connecting lines 2621. Electrode layers are preferably made of a thin conductive material, for example copper or copper alloy. This pattern reduces the amount of metal used for the electrode layer, thus reducing the cost. However, electrodes may be a full or perforated sheet or differently patterned.

Although elements 201 and holes 232 are depicted cylindrical, other shapes may be used. For example, Elements 201 (or holes 232) may be shaped as rectangular boxes or bars.

FIG. 4(a) schematically depicts an isometric view of a round multilayer modular generator 400 according to a preferred embodiment of the current invention.

In contrast to the rectangular shape of multilayer modular generator 200, round multilayer modular generator 400 is shaped as a wide cylinder. Positive lead 421a and negative lead 421b exit the casing of the round multilayer modular generator.

In the non-limiting exemplary embodiment of FIG. 4, casing of round multilayer modular generator 400 comprises a top cover 405, a bottom cover 407 and mid section 406. Preferably, a flexible seal (not seen in these figures for clarity) may be used to prevent moisture and dirt from entering the box, while allowing small relative motion of the covers in response to force applied to them.

Fasteners, such as screws 410 (three are seen, but different number of fasteners may be used), holds the casing together. Preferably, fasteners 410 apply some pressure on the layered structure within the casing, pre-loading the piezoelectric elements and ensuring mechanical and electrical contact between the piezoelectric elements and the electrode. Pre-loading the piezoelectric elements increases the energy yield of the generator and prevents energy loss for making contact in loose structure every time pressure is applied. Optionally, fasteners 410 comprise elastic elements that maintain the proper preloading force. Optionally, fasteners 410 are screws that are tightened with predetermined torque. It should be noted that mechanical and/or electrical contact between rods and electrodes may exist without preloading the screws, for example due to tightly fitting the internal elements of the generator into the box, or due to weight of the cover and/or the internal elements, or elastic properties of the internal elements or the box.

FIG. 4(b) schematically depicts a cross-sectional view of a round multilayer modular generator according to another exemplary embodiment of the current invention.

The layered structure of round multilayer modular generator is depicted, showing matrix layers 431a to 431c, electrode layers 424a to 424d and piezoelectric elements 401.

In the depicted exemplary embodiment, top and bottom covers are similar or substantially identical to reduce design and production costs. In this design, the number of layers can easily be changed by changing the length of midsection casing part 406 and inserting a different number of layers into the case.

FIG. 4(c) schematically depicts a top view of round matrix layer 424 used in a round multilayer modular generator 400 according to another exemplary embodiment of the current invention.

Round matrix layer 424 comprises holes 432 for piezoelectric elements 401 and holes 417 for fasteners 411.

Figure 5:
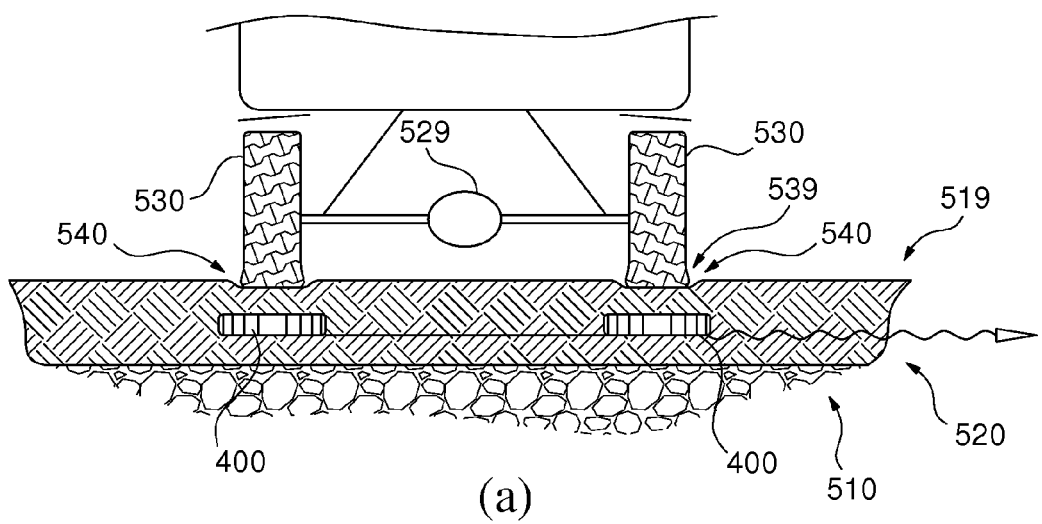
Figure 5:
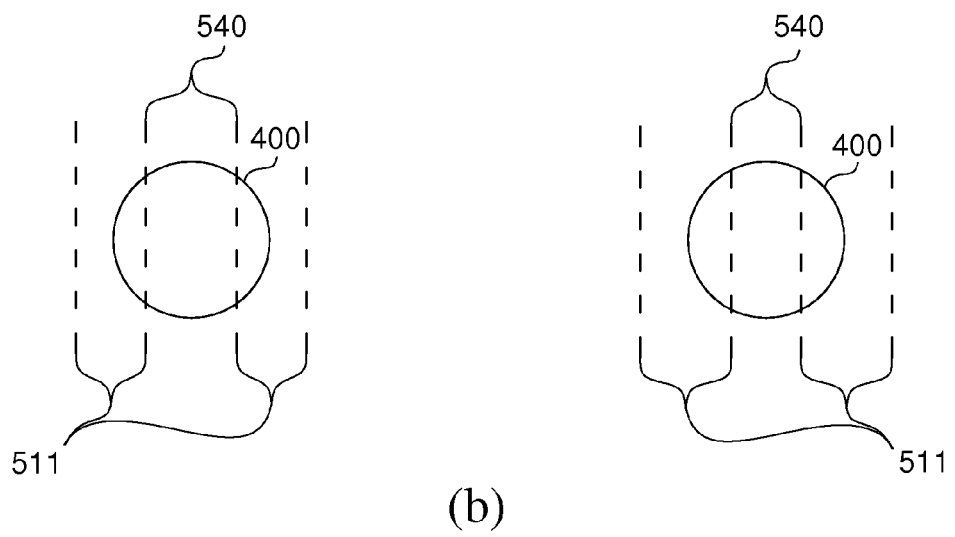
Figure 5:
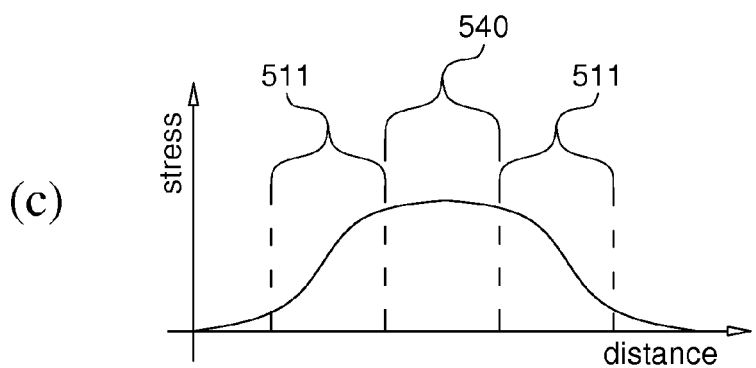

FIG. 5 demonstrates an advantage of a round multilayer modular generator according to another exemplary embodiment of the current invention.

FIG. 5(a) shows a cross section of a road with round multilayer modular generators embedded in it and vehicle over it, according to another exemplary embodiment of the current invention. When a vehicle (only axle 529 is seen for clarity), passes over a road 519, the wheels 530 slightly are distorted 539 and make a substantially rectangular contact with the road. The asphalt layer 520 of the road, which is placed over the foundation 510 slightly, distorts 540 due to the pressure applied by wheels 530 and the strain is transferred to generators 400 embedded within asphalt layer 520. For clarity, road distortion 540 was exaggerated.

FIG. 5(b) schematically depicts the stress distribution caused by a passing vehicle on a round multilayer modular generator 400 according to another exemplary embodiment of the current invention. As stress spreads deeper and latterly within the asphalt layer 520, zones of high stress 540 and zones of low stress 511 develop. By placing round multilayer modular generators 400 such that the majority of their volume is within the zones of high stress 540, efficient use of the available energy is possible.

FIG. 5(c) schematically depicts a graph of the stress distribution caused by a passing vehicle according to another exemplary embodiment of the current invention.

The zone of high stress 540 and zones of low stress 511 can be seen in this figure.

FIG. 6 schematically depicts a system 600 for energy harvesting implemented in a road and using a plurality of round multilayer modular generators 400 according to another exemplary embodiment of the current invention.

In the depicted example, two lanes road 650 having curbs 651 is embedded with a plurality of round multilayer modular generators 400, preferably placed at locations were wheels of traveling vehicles are most likely to pass. Connecting cables 614 and 612, transfer generated electrical energy to a control unit 610 for storage or for delivery to energy user such as electrical main grid vial cable 690.

Preferably, Connecting cables 614 and 612 are also embedded beneath the surface of road 650.

FIG. 7 schematically depicts steps of constructing an energy harvesting system 600 by embedding a plurality of round multilayer modular generators according to another exemplary embodiment of the current invention.

FIG. 7(a) and FIG. 7(b) schematically depict drilling, in a road, holes for embedding round multilayer modular generators, preferably using a cup drill.

Drilling circular holes in a road is easier than cutting rectangular holes. Drilling hole 710 in asphalt layer 520 having an upper surface 519 and deposited over a foundation layer 510, may be done using standard roadwork equipment, for example cup drill 701 may be used to remove a cylindrical core from the road leaving a cylindrical hole 710.

FIG. 7(c) schematically depicts cutting in a road's asphalt layer 520, slits 720 for embedding connecting cable 614, preferably using a disk saw 711 (seen in FIG. 7(b)).

Optionally, slits 720 and holes 710 are made only part way into asphalt layer 520. However any of slits 720 and holes 710 may be made all the way to or into foundation layer 510.

FIG. 7(d) schematically depicts optional stage of pouring a reinforcing layer 730, preferably made of concrete at the bottom of the drilled hole 710. The optional reinforcement layer 730 acts ad sturdy foundation for the round multilayer modular generator 400 to be placed in hole 710 and may be used to ensure desired depth of hole 710 which may not be easily drilled to the required accuracy.

FIG. 7(e) schematically depicts the stage of laying the round multilayer modular generator 400 in drilled hole 710 over optional reinforcement 730, and placing the connecting cables 614 in the cut slit 720.

FIG. 7(f) schematically depicts the stage of refilling the drilled holes and the cut slits, preferably with asphalt or bitumen 750, thus embedding round multilayer modular generator 400 and cables 614 of system 600 below the surface 519 of the road.

FIG. 8 schematically depicts a cross section of a part of railway sleeper 810 with a modular multilayer generator 200 according to yet another exemplary embodiment of the current invention.

In this cross section, multilayer modular generator 800 is seen placed in a recess in sleeper 810. Preferably multilayer modular generator 800 is multilayer modular generator 200 as depicted in FIG. 2, but other types of multilayer modular generators may be used. For example round multilayer modular generator 400. Optionally, internal elements depicted in FIG. 3 or 4(b) are placed in a recess in sleeper 810 such that the internal recess acts as a box and mount 840 and elastomeric layer 850 acts as cover.

When a train traverses along rail 830, stress caused by the train's weight it transferred via rail 830, mount 840 and elastomeric layer 850 and presses on multilayer modular generator 200, causing charge to be generated in said generator. Depth of recess for multilayer modular generator 800 in sleeper 810 is limited by metal reinforcement cables or bars 820 in sleeper 810. This depth limits the number of layers in multilayer modular generator 200. However, Sleeper 810 may be redesigned to allow deeper recesses. Similarly, width of for multilayer modular generator 800 in sleeper 810 is limited by the distance between screws 825 which hold mount 840 to sleeper 810; however, sleeper 810 may be redesigned to allow wider or narrower recesses.

It should be noted that rods 201 multilayer modular generator 200 (401 for round multilayer modular generator 400) are at least slightly longer than the corresponding matrix layer 231 (431), thus, when pressure is applied between the top and the bottom of the multilayer modular generator 200 (400), a physical and electrical contact is formed between the edges of rods 201 (401) and electrodes 224 (424). Electrode layers 224 (424) electrically connect rods 201(401) in parallel. Pressure may be applied using fasteners 410 (not seen in FIGS. 2(*a*) and 2(*b*), but shown in FIGS. 4(*a*) and 4(*b*)). Alternatively or additionally, pressure may be applied by the weight of cover 212 (405), which may be made of heavy material for example concrete or metal. Optionally, the entire box is made of concrete. Alternatively or additionally, pressure may be applied by encapsulation of the entire multilayer modular generator in elastic encapsulation. Encapsulation may also provide added protection against moisture, in addition to seal 214 (seen in FIG. 2(*b*), but may be implemented in round modular generator 400 as well). Alternatively or additionally, pressure may be applied by the weight of embedding material used for covering the multilayer modular generator, for example asphalt or bitumen layer 750 seen in FIG. 7(*f*) for the case of round multilayer modular generator 400, but similarly applies when embedding multilayer modular generator 200. When a multilayer modular generator is embedded in railroad sleeper (FIG. 8), the weight of the track 830, and pressure applied to hold track 830 in place causes physical and electrical contact between the edges of rods and the electrodes.

Optionally, a pressure spreading layer (not shown for clarity) may be inserted between cover 212 (405) and top electrode layer 224*d* (424*d*). In this case, the cover 212 (405) may be relatively thin and mechanical forces applied to the cover is transferred to said pressure spreading layer and spread among the plurality of rods 201 (401). Similarly, optionally, a pressure spreading layer (not shown for clarity) is inserted between the bottom of box 210 (407) and bottom electrode layer 224*a* (424*a*) to spread the forces. Alternatively, optionally or additionally covers 212 (405) are stiff and acts as force spreading member.

FIG. 9(*a*) schematically depicts an isometric view of a multilayer super-module generator 900 according to yet another exemplary embodiment of the current invention.

Super-module generator 900 preferably comprises a container 910 within which a plurality of multilayer modular generator 200 is placed. Optionally container 910 is divided to chambers by dividers 930.

Alternatively, internal parts of multilayer modular generator 200, as depicted in FIG. 3 are placed in each chamber of container 910 and covered with individual or a common cover (not seen in this figure). Leads 921 from each multilayer modular generator are united into electrical cable 912.

It should be noted that the array of 2×3 multilayer modular generators 200 in a super-module generator 900 is exemplary, and other shapes, number and orientations of multilayer modular generators is possible.

Multilayer modular generator 200, round generator 400, and super-module generator 900 may be embedded in a road, airport runway, indoor floor or street pavement to harvest energy from vehicles or pedestrians.

FIG. 9(*b*) schematically depicts a top view of a system for energy harvesting 960, implemented in a road 650 and using a plurality of multilayer super-module generators 900, according to yet another exemplary embodiment of the current invention.

In this figure, system for energy harvesting 960 comprises a plurality of multilayer super-module generators 900 and connecting cables 912, embedded below the surface of a road or a highway 650.

In the depicted example, two lanes road 650 having curbs 651 is embedded with a plurality super-module generators 900, preferably placed at locations were wheels of traveling vehicles are most likely to pass. Connecting cables 912, transfer generated electrical energy to a control unit 918 for storage or for delivery to energy user such as electrical main grid vial cable 990.

For simplicity, only one lane of road 650 is seen fitted with super-module generators 900, however, few or all lanes may be fitted with super-module generators 900.

In the depicted example, super-module generators 900 are seen placed to form a single row. However, super-module generators 900 may be placed in two rows per lane, each where a wheel of a traveling care is likely to pass. Optionally, super-module generators 900 may be placed in a two dimensional array to tile a large area.

It should be noted the novel modular multilayer construction of multilayer modular generator 200, round multilayer modular generator 400 and super-module generators 900 enables flexible fitting of a piezoelectric generator to its specific application, preferably with minimal redesign of few mechanical parts such as box 210, mid section 406 or container 910.

It should be noted that modular generator 200, round modular generator 400 and super-module generator 900 may be embedded under the surface 519 of the road, or alternatively, modular generator 200, round modular generator 400 and super-module generator 900 may be placed such that their upper surface is flush with the surface 519 of the road so that mechanical pressure is directly transferred to their covers. In this later case, asphalt or bitumen layer 750 seen in FIG. 7(*f*) is missing.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed:

1. A multilayer generator comprising:
a box having a top cover;
a bottom electrode placed above a bottom of said box;
a top electrode placed below said top cover; and
a multilayer electricity generating structure positioned between said bottom electrode and said top electrode, each layer of said multilayer electricity generating structure comprising a plurality of piezoelectric rods held in place by a matrix layers, wherein:
thickness of said matrix layers is smaller than length of said plurality of piezoelectric rods in a corresponding layer, and
said piezoelectric rods are oppositely poled in alternating layers, adjacent layers being separated by a central electrode.

2. The multilayer generator of claim 1, wherein said box and said matrix layers are substantially cylindrical.

3. The multilayer generator of claim 2, wherein said box is constructed of a round top cover, a round bottom cover and a cylindrical mid section.

4. The multilayer generator of claim 3, wherein said round top cover and said round bottom cover are substantially identical.

5. The multilayer generator of claim 1, wherein said matrix layers are shaped and sized to snugly fit inside said box.

6. The multilayer generator of claim 5, wherein said matrix layers are configured to withstand sheer stresses in said plurality of piezoelectric rods due to pressure applied on said cover.

7. The multilayer generator of claim 6, wherein said matrix layers are made of a non-conductive material.

8. The multilayer generator of claim 1, and further configured such that when pressure is applied to said cover, the applied pressure causes mechanical and electrical contact between ends of said piezoelectric rods and the nearest electrodes.

9. The multilayer generator of claim 8, wherein rods in each layer are poled in the same direction, and are electrically connected in parallel by two of said electrodes such that the charge generated by said layer is the sum of the charges generated by all the rods in said layer.

10. The multilayer generator of claim 9, wherein alternating electrode layers are joined such that the voltage generated by said entire multilayer generator is substantially equal to the voltage generated by one rod, and the charge generated by said entire multilayer generator is substantially equal to the sum of charges generated by all said rods.

11. The multilayer generator of claim 8 and further comprising fasteners, wherein said fasteners are configured to apply preloading force on said cover.

12. The multilayer generator of claim 8, wherein said cover is stiff and is configured to substantially evenly spread force applied to said cover among said piezoelectric rods.

13. The multilayer generator of claim 8 and further comprising a load spreading layer situated between said cover and said top electrode, said load spreading layer configured to receive force applied to said cover and to substantially evenly spread force among said piezoelectric rods.

14. The multilayer generator of claim 1, wherein said at least one of said box and said cover is made of concrete.

15. The multilayer generator of claim 1, wherein said box and said matrix layers are shaped as polygons.

16. The multilayer generator of claim 1 and further comprising a seal situated between said box and said cover.

17. A multilayer super-module generator comprising:
a box having a plurality of chambers; and
at least one top cover, wherein in each chamber:
a bottom electrode is positioned above the bottom of said chamber;
a top electrode is positioned below said top cover; and
a multilayer electricity generating structure is positioned between said bottom electrode and said top electrode, each layer of said multilayer electricity generating structure comprising a plurality of piezoelectric rods held in place by a matrix layer, wherein:
thickness of said matrix layer is smaller than length of said plurality of piezoelectric rods in a corresponding layer,
said piezoelectric rods are oppositely poled in alternating layers; and
adjacent layers are separated by a central electrode.

18. The multilayer super-module generator of claim 17, wherein each chamber has a separate top cover.

19. The multilayer super-module generator of claim 17, wherein all the chambers are covered by same top cover.

20. The multilayer super-module generator of claim 17, wherein:
rods in each layer in each chamber are poled in the same direction, and are electrically connected in parallel by two of said electrodes, alternating electrode layers in each chamber are joined such that the voltage generated by said entire multilayer generator in each chamber is substantially equal to the voltage generated by one rod, and the charge generated by said entire multilayer generator is substantially equal to the sum of charges generated by all said rods, and
said generators in said chambers are electrically joined in parallel.

* * * * *